(12) United States Patent
Nakahata et al.

(10) Patent No.: US 10,919,535 B2
(45) Date of Patent: Feb. 16, 2021

(54) OPERATOR STATE DETERMINING DEVICE

(71) Applicant: Mazda Motor Corporation, Hiroshima (JP)

(72) Inventors: Youichiro Nakahata, Aki-gun (JP); Yohei Iwashita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/365,893

(22) Filed: Mar. 27, 2019

(65) Prior Publication Data

US 2019/0300000 A1   Oct. 3, 2019

(30) Foreign Application Priority Data

Mar. 28, 2018  (JP) ................................. 2018-061557

(51) Int. Cl.
*B60W 40/08* (2012.01)
*G06K 9/00* (2006.01)

(52) U.S. Cl.
CPC ......... *B60W 40/08* (2013.01); *G06K 9/00845* (2013.01); *B60W 2040/0827* (2013.01)

(58) Field of Classification Search
CPC .......... B60W 2040/0827; B60W 40/08; G06K 9/00845
See application file for complete search history.

(56) References Cited

U.S. PATENT DOCUMENTS

| 6,049,747 A * | 4/2000 | Nakajima | B60N 2/002 340/576 |
|---|---|---|---|
| 2007/0159344 A1* | 7/2007 | Kisacanin | G06K 9/00362 340/576 |
| 2010/0214105 A1* | 8/2010 | Manotas, Jr. | A61B 3/113 340/575 |
| 2013/0021463 A1* | 1/2013 | Hatakeyama | A61B 5/1103 348/78 |
| 2014/0139655 A1* | 5/2014 | Mimar | G08B 21/06 348/77 |

(Continued)

FOREIGN PATENT DOCUMENTS

| JP | 2017205368 A | 11/2017 |
|---|---|---|
| JP | 2017206173 A | 11/2017 |

*Primary Examiner* — Omer S Khan
(74) *Attorney, Agent, or Firm* — Alleman Hall Creasman & Tuttle LLP (57) ABSTRACT

An operator state determining device is provided, which includes an image pick-up device disposed inside a vehicle cabin, and configured to image an operator from the side, a torso angle detector configured to detect an operator's torso angle, a posture measuring module configured to measure a head-pitch angle change that is a difference between a head-pitch angle of the operator before the operator becomes unconscious and a head-pitch angle of the operator after the operator becomes unconscious, based on the image, a memory configured to store a given turnout angle and a given head-pitch angle change, and an abnormality determining module configured to determine an operator's abnormality. The abnormality determining module determines that the operator is in an abnormal state when an initial torso angle before becoming unconscious is inclined rearward more than the turnout angle, and the head-pitch angle change is greater than the given head-pitch angle change.

9 Claims, 9 Drawing Sheets

(56) References Cited

U.S. PATENT DOCUMENTS

2017/0036673 A1* 2/2017 Lee .................. G06F 3/017
2017/0158054 A1* 6/2017 Munaoka ............ B60W 40/08
2017/0161576 A1* 6/2017 Banno ................ G06T 7/73

* cited by examiner

OPERATOR STATE DETERMINING DEVICE

TECHNICAL FIELD

The present disclosure relates to an operator state determining device which determines an abnormal state of an operator who operates a vehicle, and belongs to a field of safety technology of vehicles such as automobiles.

BACKGROUND OF THE DISCLOSURE

As one such vehicle safety technology, a technology of determining an abnormal state of an operator based on an operating posture of the operator is known.

For example, JP2017-205368A discloses, as a technology of determining the abnormal state based on the operator's operating posture, a technology in which an internal camera which is disposed at a front pillar on the passenger seat side of a cabin, as an image pick-up device, images the operator from the side, and by using the captured image data, it is determined whether the operator's posture is within a proper angle range based on an operator's torso angle (a rearward angle of the torso with respect to the vertical direction) to determine the existence of the operator's abnormal state.

While the determination device of JP2017-205368A determines that the operator's state is in an abnormal state when the torso angle is a value on a forward-inclination side with respect to a threshold angle on the forward-inclination side, since the abnormal state may occur in postures other than the forward-inclination posture, i.e., the abnormal state may also occur in postures on the rearward-inclination side, there is room for an improvement of the abnormality determination on the rearward-inclination side.

Similar to the determination device described above, JP2017-206173A discloses a technology in which an internal camera disposed at a front pillar on the passenger seat side of a cabin, as an image pick-up device, images an operator from the side, and by using the captured image data, it is determined whether an operator's posture is within a proper angle range based on a parietal angle of the operator (a forward or rearward angle of a line connecting the waist and the top of the head of the operator with respect to the vertical direction) to determine the existence of the operator's abnormal state.

Further, in JP2017-206173A, since a first threshold angle on the forward-inclination side and a second threshold angle on the rearward-inclination side are provided for the proper angle range, it is possible to determine an abnormal state on the rearward-inclination side, in addition to the abnormal state on the forward-inclination side.

Further, according to JP2017-206173A, as a method of determining a more precise abnormal state particularly for the rearward-inclination side, the determination device also detects a torso angle and uses the torso angle as a parameter for improving the accuracy of the abnormality determination. For example, when the parietal angle is larger than the second threshold angle on the rearward-inclination side, the parietal angle on the rearward-inclination side is compared with the torso angle on the rearward-inclination side, and if the rearward-inclination degree of the parietal angle is larger than the torso angle, it determines that the operator's state is the abnormal state.

In the technology of JP2017-206173A, as described above, if the parietal angle exceeds the first threshold angle on the forward-inclination side further forward (e.g., θh1 in FIG. 8), the state is determined to be the abnormal state, and, on the other hand, if the parietal angle exceeds the second threshold angle on the rearward-inclination side further rearward (e.g., θh2 in FIG. 8), the state is determined to be the abnormal state. In other words, when the parietal angle is between the first threshold angle and the second threshold angle (proper range), the operator's state is always determined to be proper, regardless of the torso angle.

Figure 8:
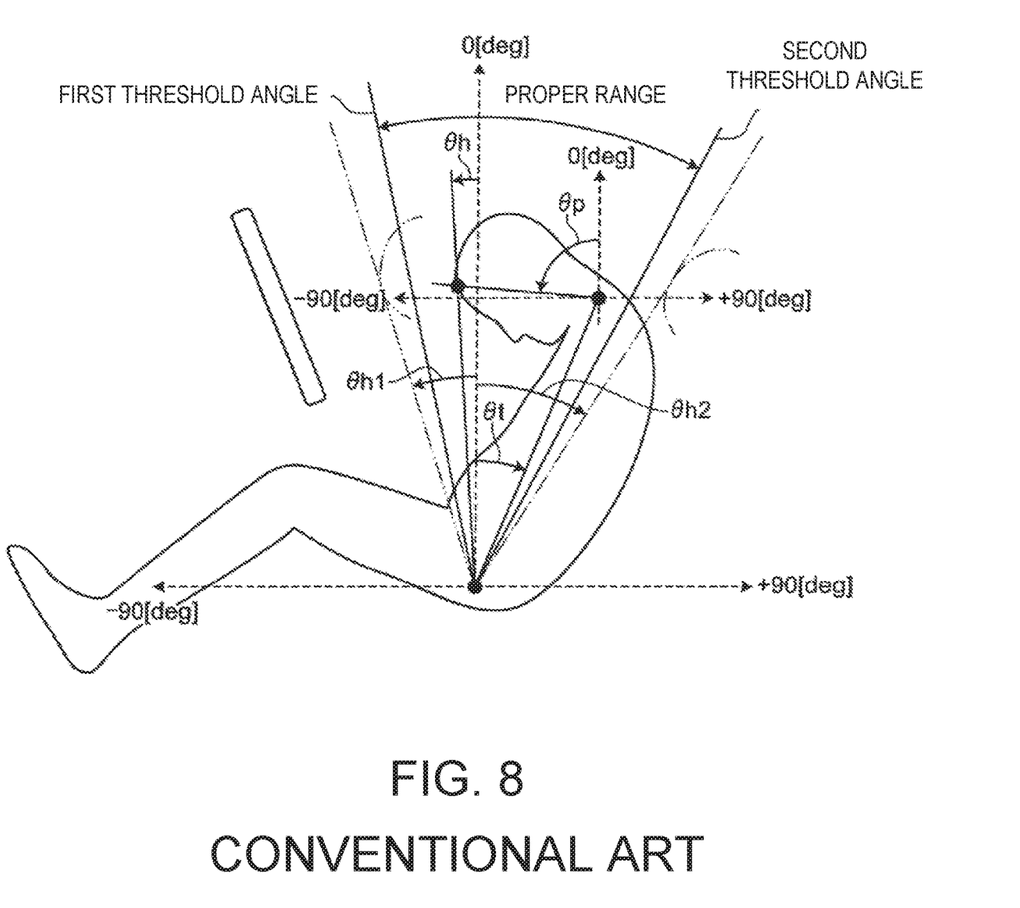
FIG. 8 is a view schematically illustrating an operating posture of an operator after an operator becomes unconscious.

However, as illustrated in FIG. 8, even if the parietal angle is within the proper range, when the sum of a torso angle θt (an inclination angle on the rearward-inclination side) and a parietal angle θh (an inclination angle on the forward-inclination side) is beyond a given value, an angle θp of a straight line which connects a root of head and a top of head with respect to the vertical direction (hereinafter, referred to as a "head-pitch angle") increases, which is assumed to be a state where the head hangs down forward (a head-down state). As may be apparent from FIG. 8, in such a state, the operator may have fallen into the abnormal state.

Thus, since there are wide varieties of operating postures for an operator who fell unconscious, the operator's abnormalities must be detected whatever the condition may be.

SUMMARY OF THE DISCLOSURE

Therefore, one purpose of the present disclosure is to certainly determine an operator's abnormal state in consideration of wide varieties of the operator's operating postures in the abnormal state.

Meanwhile, in order to address the situations described above, the applicant realized as new findings that the operator's operating posture in an unconscious state includes a case where an initial torso angle becomes such that the operator inclines or falls forward with respect to a given turnout angle and a case where the initial torso angle becomes such that the operator inclines or falls rearward with respect to the given turnout angle.

Note that in the findings described above, although the torso angle is used, it can be substituted by a seat-back angle which is reflected in the operator's torso angle. Below, the "torso angle" and the "seat-back angle" may also be referred to as a "rearward-inclination angle."

In order to address the situations, based on the findings, an operator state determining device according to the present disclosure is configured as follows.

First, an operator state determining device according to one aspect of the present disclosure includes an image pick-up device disposed inside a cabin of a vehicle, and configured to image an operator from a side, the image pick-up device also being configured as a torso angle detector configured to detect a torso angle of the operator, a processor configured to execute a posture measuring module to measure a head-pitch angle change that is a difference between a head-pitch angle of the operator before the operator becomes unconscious and a head-pitch angle of the operator after the operator becomes unconscious, based on the image of the operator imaged by the image pick-up device, and memory configured to store a given turnout angle and a given head-pitch angle change. The processor is further configured to execute an abnormality determining module to determine an abnormality of the operator. The abnormality determining module determines that the operator is in an abnormal state when an initial torso angle detected by the torso angle detector before the operator becomes unconscious is inclined rearward more than the turnout angle, and the head-pitch angle change is greater than the given head-pitch angle change.

Note that the detection of the torso angle by the torso angle detector may be based on the image of the operator imaged by the image pick-up device, or an inclination angle of a seat back.

According to this configuration, the operator state determining device includes the image pick-up device configured to image the operator and determines, based on the image, whether the initial torso angle which is a torso angle before the operator becoming unconscious is inclined rearward more than the given turnout angle. Thus, whether the operator falls forward or rearward after the operator becomes unconscious can be predicted.

Since the abnormality determining module determines that the operator is in an abnormal state when the initial torso angle is inclined rearward more than the given turnout angle, and the head-pitch angle change is greater than the given head-pitch angle change, the abnormal state of the operator can be determined using a parameter and a threshold suitable for a case where the operator falls rearward after becoming unconscious.

As a result, in a case where the abnormal state of the operator is determined based on a change in the posture of the operator before and after becoming unconscious, the abnormality determination especially when the operator falls rearward after becoming unconscious can accurately be executed.

The posture measuring module may measure a torso angle change that is a difference between the torso angle before the operator becomes unconscious and the torso angle after the operator becomes unconscious, based on the torso angle of the operator detected by the torso angle detector. The memory may store a given second head-pitch angle change and a given torso angle change. The abnormality determining module may determine that the operator is in the abnormal state when the initial torso angle is forward and less than the given turnout angle, the head-pitch angle change is greater than the given second head-pitch angle change and the torso angle change is greater than the given torso angle change.

According to this configuration, whether the initial torso angle is inclined rearward more than the given turnout angle is determined, and whether the operator falls forward or rearward after the operator becomes unconscious is predicted.

The abnormality determining module determines that the operator is in an abnormal state when the initial torso angle is forward and less than the given turnout angle, the head-pitch angle change is greater than the given second head-pitch angle change and the torso angle change is greater than the given torso angle change, in addition to the determination whether the initial torso angle is greater than the given turnout angle described above.

Thus, the abnormal state of the operator can also be determined in a case where the operator falls forward after becoming unconscious, using a parameter and a threshold suitable for this case.

That is, since the torso angle change and the head-pitch angle change before and after the operator becomes unconscious vary between the case of falling forward and the case of falling rearward after the operator becomes unconscious, the given second head-pitch angle change, the given torso angle change, and a given rearward head-pitch angle change are set as the threshold suitable for the variation, the accuracy of the determination of the operator abnormality can be improved.

In this manner, whether the operator falls forward or rearward after becoming unconscious is predicted from the initial torso angle, and based on the prediction result, the parameter and the threshold for the abnormality determination of an operating posture of the operator are changed between the case where the operator falls forward and the case where the operator falls rearward after becoming unconscious. As a result, regardless of the operator's posture when the operator is in an abnormal state, the abnormality determination can accurately be executed.

The given head-pitch angle change may be less than the given second head-pitch angle change.

According to this configuration, since the given head-pitch angle change is less than the given second head-pitch angle change, the threshold is set taking into consideration that the head-pitch angle change of the operator when the operator falls rearward after becoming unconscious is less than the head-pitch angle change of the operator when the operator falls forward after becoming unconscious. As a result, the abnormal state of the operator if the operator falls rearward after becoming unconscious can surely be determined.

The turnout angle may be a given angle between 35° and 40°.

According to this configuration, the torso angle and the turnout angle are described specifically, and the torso angle is an inclination angle with respect to the vertical direction of the torso and the turnout angle is a given angle between 35° and 40°.

The torso angle may be an inclination angle of a seat back with respect to a vertical direction, and the turnout angle is a given angle between 30° and 35°.

According to this configuration, the torso angle and the turnout angle are described specifically, and the torso angle is the inclination angle of the seat back with respect to the vertical direction and the turnout angle is a given angle between 30° and 35°.

The abnormality determining module may not determine the abnormality when an acceleration of the vehicle is greater than a given acceleration.

According to this configuration, when the acceleration of the vehicle is greater than the given acceleration, since the abnormality is not determination, misjudgment resulting from not considering that the change in the torso angle change and the head-pitch angle change when the acceleration is greater than the given acceleration is less than that when the acceleration is the given acceleration or less, is prevented.

BRIEF DESCRIPTION OF THE DRAWINGS

FIGS. 5A and 5B are views illustrating a case where the initial torso angle of the operator is less than a given turnout angle, where FIG. 5A illustrates an operating posture before the operator becomes unconscious, and FIG. 5B illustrates an operating posture after the operator becomes unconscious.

FIGS. 5C and 5D are views illustrating a case where the initial torso angle of the operator is more than the given turnout angle, where FIG. 5C illustrates an operating posture before the operator becomes unconscious, and FIG. 5D illustrates an operating posture after the operator becomes unconscious.

DETAILED DESCRIPTION OF THE DISCLOSURE

Hereinafter, one embodiment of an operator state determining device of the present disclosure is described.

Figure 1:
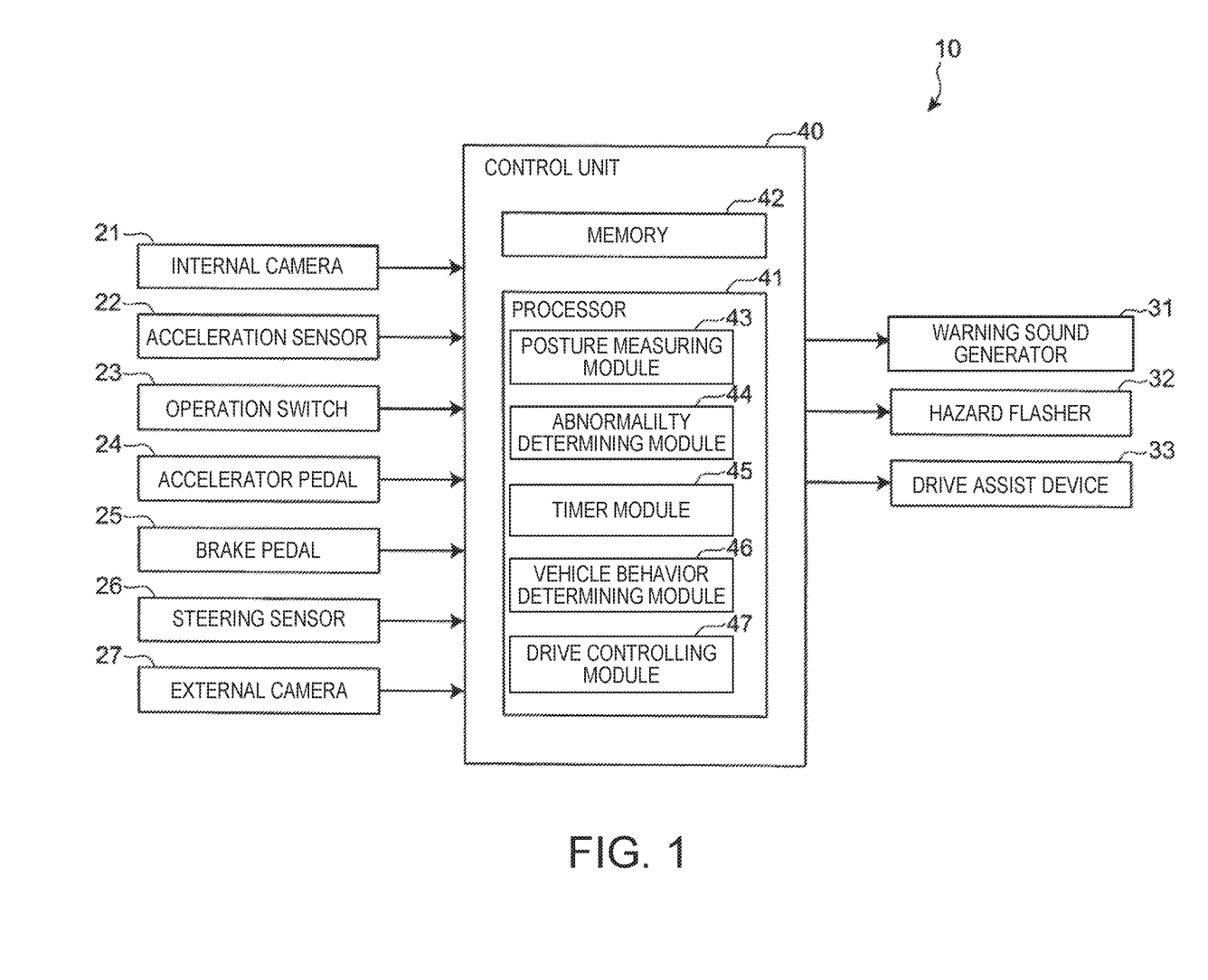
FIG. 1 is a control system diagram of an operator state determining device according to one embodiment of the present disclosure.

First, FIG. 1 is a control system diagram schematically illustrating a configuration of an operator state determining device 10 according to this embodiment, which is mounted to a vehicle. The operator state determining device 10 includes an internal camera 21, an acceleration sensor 22, an operation switch 23, an accelerator pedal 24, a brake pedal 25, a steering sensor 26, an external camera 27, a warning sound generator 31, a hazard flasher 32, a drive assist device 33, and a control unit 40.

The internal camera 21 as an image pick-up device and a rearward-inclination detector (torso angle detector) is attached to a front pillar, for example, on the passenger seat side, inside a cabin of the vehicle so that an optical axis of the internal camera 21 is directed toward a driver's seat of the vehicle. The internal camera 21 images an operator or driver of the vehicle from the side. The internal camera 21 outputs the captured image data to the control unit 40.

Note that the internal camera 21 may be attached to a ceiling part of the side of the driver's seat inside the cabin of the vehicle so that the optical axis of the internal camera 21 is directed toward the driver's seat of the vehicle. Alternatively, a plurality of cameras may be attached to a front pillar on the passenger seat side, a ceiling part inside the cabin of the vehicle, etc. so that all the optical axes are directed toward the driver's seat of the vehicle.

The acceleration sensor 22 detects an acceleration of the vehicle. The acceleration sensor 22 outputs the detected acceleration of the vehicle to the control unit 40. The operation switch 23 is to stop the operation of the warning sound generator 31, and is operated by the operator. The accelerator pedal 24 is to adjust an accelerator opening, and is operated by an operator's foot. The brake pedal 25 is to operate a brake, and is operated by the operator's foot. The steering sensor 26 is disposed at a steering wheel 12, and detects a torque applied to the steering wheel 12 by the operator.

The external camera 27 is attached to, for example, a windshield of the vehicle, and images line(s), proceeding vehicle(s), obstacle(s), etc. on a traveling road of the vehicle. The external camera 27 outputs the captured image data to the control unit 40.

The warning sound generator 31 includes, for example, a buzzer or a bell, and generates a warning sound to the operator. The hazard flasher 32 blinks all the directional lights or blinkers at once which may be orange, for example. The drive assist device 33 assists operation of the vehicle by the operator. The drive assist device 33 may have a function to automatically operate the brake to slow down or stop the vehicle. The drive assist device 33 may have a function to maintain the vehicle in a lane by controlling the steering wheel 12. The drive assist device 33 may have a function to execute an autonomous driving control of the vehicle.

The control unit 40 controls the entire operation of the vehicle. The control unit 40 includes a processor (e.g., a CPU (Central Processing Unit)) 41, memory 42, and other peripheral circuits. The memory 42 is comprised of, for example, semiconductor memory, such as flash memory, as well as a hard disk, and/or other storage cells. The memory 42 includes memory which temporarily stores memory data holding computer program(s). Note that the memory 42 may be comprised of a single memory provided with a memory area where the program(s) is stored and a memory area where data is temporarily stored.

Moreover, the memory 42 stores, as part of the program(s), a given turnout angle $\theta 0$, a given second head-pitch angle change $\theta 1$, a given torso angle change $\theta 2$ as a given rearward-inclination angle change, and a given head-pitch angle change $\theta 3$, which will be described later.

The given turnout angle $\theta 0$ is a turnout angle of an initial torso angle $\theta t$ which is a boundary of the operator inclining forward or rearward after becoming unconscious.

The given second head-pitch angle change $\theta 1$ is a threshold for determining an abnormal state of an amount of change in the operating posture of the operator before and after becoming unconscious when the initial torso angle is less than the given turnout angle $\theta 0$ (when the operator inclines or falls forward after becoming unconscious).

The given torso angle change $\theta 2$ is a threshold for determining the abnormal state of the amount of change in the operating posture of the operator before and after becoming unconscious when the initial torso angle is less than the given turnout angle $\theta 0$ (when the operator inclines or falls forward after becoming unconscious).

The given head-pitch angle change $\theta 3$ is a threshold for determining the abnormal state of the amount of change in the operating posture of the operator before and after becoming unconscious when the initial torso angle is greater than the given turnout angle $\theta 0$ (when the operator inclines or falls rearward after becoming unconscious).

Note that in this embodiment, the given turnout angle $\theta 0$, the given second head-pitch angle change $\theta 1$, the given torso angle change $\theta 2$, and the given head-pitch angle change $\theta 3$ are calculated by a simulation described later.

The processor 41 operates according to the program(s) stored in the memory 42 to execute a posture measuring module 43, an abnormality determining module 44, a timer module 45, a vehicle behavior determining module 46, and a drive controlling module 47 to perform their respective functions.

The posture measuring module 43 measures, from the image data captured by the internal camera 21, an operator's initial torso angle $\theta t$, a torso angle change $\Delta \theta t$ which is an amount of change in the torso angle from the initial posture, and a head-pitch angle change $\Delta \theta p$ which is an amount of change in a head-pitch angle from the initial posture.

Figure 2:
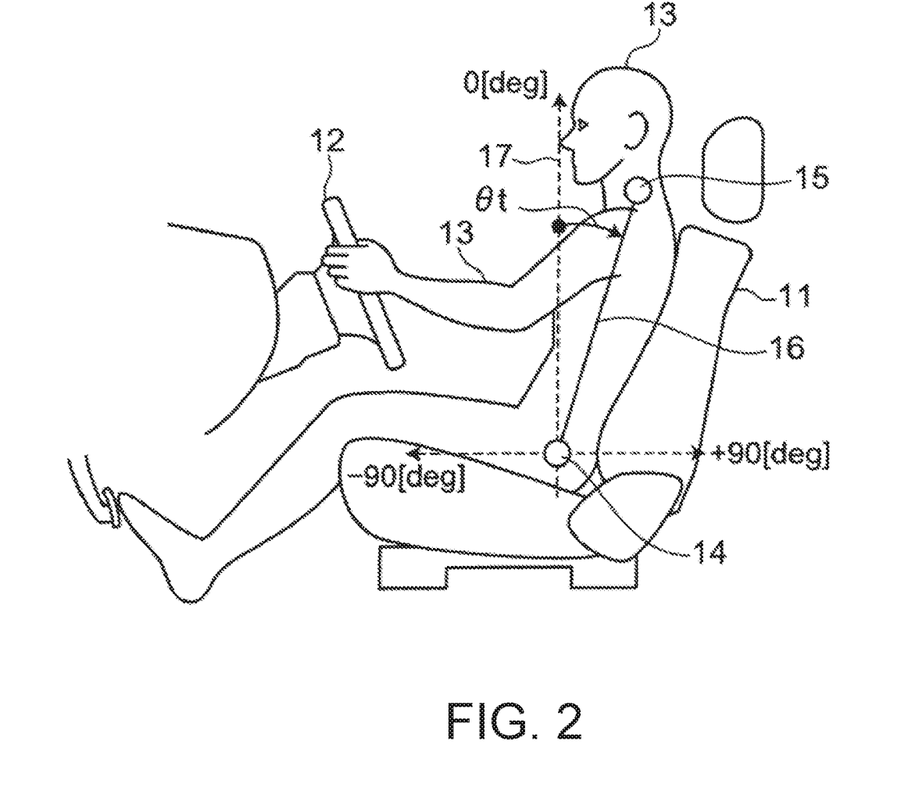
FIG. 2 is a view illustrating a torso angle.
Figure 3:
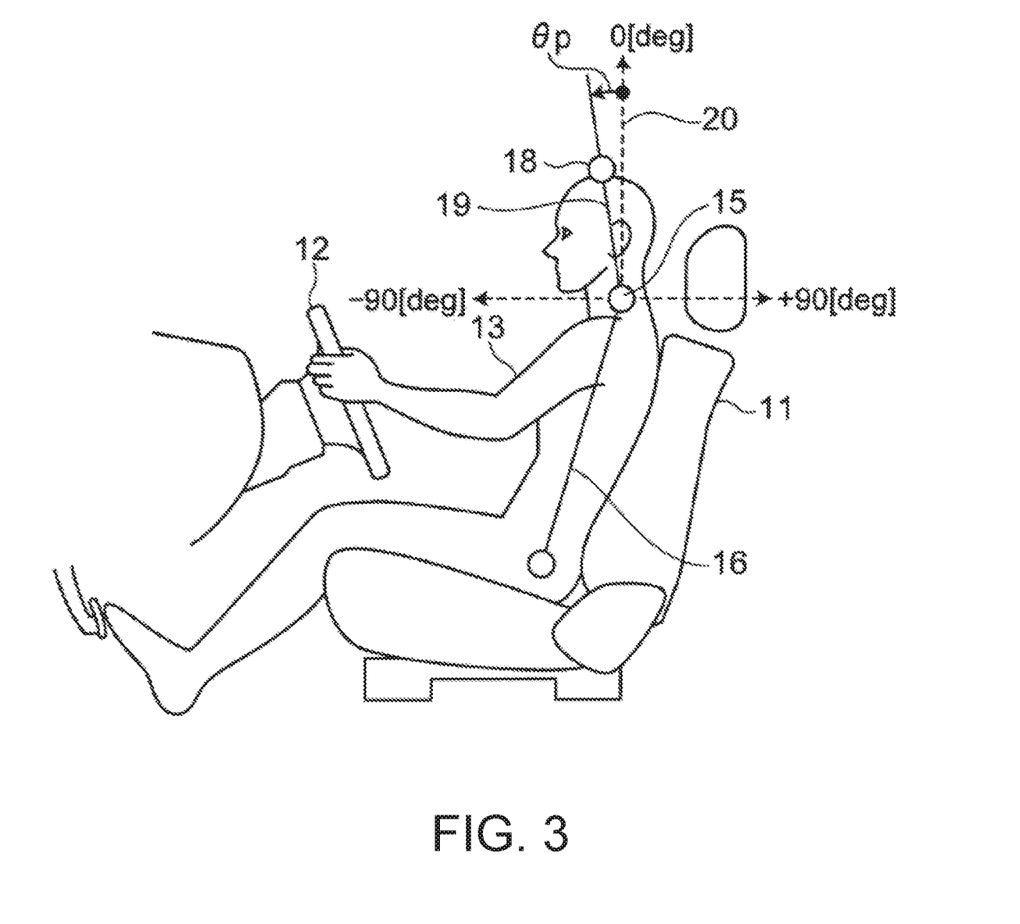
FIG. 3 is a view illustrating a pitch angle.

Here, the torso angle $\theta t$ and a head-pitch angle $\theta p$ are described using FIGS. 2 and 3. In FIGS. 2 and 3, a state where an operator 13 who sits down on a driver's seat 11 and operates the vehicle while gripping the steering wheel 12 is seen from the side is illustrated.

As illustrated in FIG. 2, the torso angle $\theta t$ is an inclination angle of the torso with respect to the vertical direction. For example, the torso angle $\theta t$ is an inclination angle of a straight line 16 which connects a lower end of waist 14 and a root of head 15 with respect to a vertical line 17.

As illustrated in FIG. 3, the pitch angle θp is an inclination angle of a straight line 19 which connects the root of head 15 and a top of head 18 with respect to a vertical line 20.

The posture measuring module 43 detects the lower end of the waist 14 and the root of head 15 of the operator which are extracted by template matching, etc., and measures the torso angle θt and the pitch angle θp.

In this embodiment, as illustrated in FIG. 2, the torso angle θt is −90° when the root of head 15 is located horizontally forward of the lower end of the waist 14, and is +90° when the root of head 15 is located horizontally rearward of the lower end of the waist 14. That is, in this embodiment, the torso angle θt is set as a negative value when the operator is in a forward-inclination posture, and is set as a positive value when in a rearward-inclination posture. While the operator is operating normally, as illustrated in FIG. 2, the torso angle θt is usually a positive value.

Moreover, as illustrated in FIG. 3, the head-pitch angle θp is −90° when the top of the head 18 is horizontally forward of the root of head 15, and is +90° when the top of the head 18 is horizontally rearward of the root of head 15. That is, in this embodiment, the head-pitch angle θp is set as a negative value when the top of the head 18 falls forward with respect to the root of head 15, and is set as a positive value when falls rearward. While the operator is operating normally, as illustrated in FIG. 3, the head-pitch angle θp is usually a negative value.

Returning to FIG. 1, the abnormality determining module 44 determines whether the operator falls forward or rearward after the operator becomes unconscious based on the operator's initial torso angle θt measured by the posture measuring module 43 and the given turnout angle θ0 stored in the memory 42.

If the initial torso angle θt is less than the given turnout angle θ0, the abnormality determining module 44 then determines whether the head-pitch angle change Δθp is greater than the given second head-pitch angle change θ1 (e.g., 55°). If the head-pitch angle change Δθp is greater than the given second head-pitch angle change θ1, the abnormality determining module 44 then determines whether the torso angle change Δθt is greater than the given torso angle change θ2 (e.g., 15°). If a state where the torso angle change Δθt is greater than the given torso angle change θ2 continues for more than a given period of time T (in this embodiment, for example, T=1 second), the abnormality determining module 44 determines that the operator is in the abnormal state. Note that the timer module 45 counts a continuation time from a time point at which the head-pitch angle change Δθp is determined to be greater than the given second head-pitch angle change θ1 and the torso angle change Δθt is determined to be greater than the given torso angle change θ2.

After the timer module 45 counts the given time, the abnormality determining module 44 gives an alert to the operator by the alarm, etc., and if there is no reaction of the operator, a driving assist is carried out.

On the other hand, if the initial torso angle θt is less than the given turnout angle θ0, the head-pitch angle change Δθp is greater than the given second head-pitch angle change θ1, and the torso angle change Δθt is less than the given torso angle change θ2, the vehicle behavior determining module 46 then determines whether the vehicle behavior is abnormal.

Note that as parameters for determining the abnormal state of the vehicle behavior, an excessive acceleration or deceleration, a lane deviation degree, and a collision margin time are used, for example. Here, a method of determining the abnormality of the vehicle is described briefly.

If the excessive acceleration or deceleration is used as the parameter, the vehicle behavior determining module 46 acquires the acceleration of the vehicle from the acceleration sensor and determines whether the excessive acceleration or deceleration has occurred. Alternatively, the vehicle behavior determining module 46 may determine whether operation of the accelerator pedal 24 or the brake pedal 25 has deviated from a pedal operation model stored beforehand in the memory 42.

If the lane deviation degree is used as the parameter, the vehicle behavior determining module 46 determines, in a lane deviation determination, whether the vehicle has deviated from the lane based on the lane imaged by the external camera 27, etc. For example, based on the image of the external camera 27 of the vehicle, the vehicle behavior determining module 46 determines whether a difference between a distance from the center of the vehicle to the lane and a distance from the center of the vehicle to the vehicle body side part is 0 m or less. Moreover, if the traveling road of the vehicle is curved, the vehicle behavior determining module 46 determines whether the vehicle will deviate from the lane based on a curvature of the lane imaged by the external camera 27, etc., and a future traveling route of the vehicle calculated from a steering angle and a traveling speed of the vehicle.

If the collision margin time is used as the parameter, the vehicle behavior determining module 46 determines whether the vehicle and a proceeding vehicle or an obstacle around the vehicle have rapidly approached each other based on the image of the environment around the vehicle imaged by the external camera 27, etc. For example, based on the image of the external camera 27, the vehicle behavior determining module 46 determines whether the collision margin time which is obtained by dividing a distance from the vehicle to the proceeding vehicle by a relative speed of the vehicle with respect to the proceeding vehicle indicates a timing less than a given threshold (e.g., 2.0 seconds). The collision margin time with the possibility that the vehicle will collide with the proceeding vehicle is applied to the given threshold. Note that in this embodiment, although the distance and the relative speed between the vehicle and the proceeding vehicle are determined based on the image of the external camera 27, a millimeter wave radar, etc. may be used instead of the external camera 27.

If the vehicle behavior determined by the vehicle behavior determining module 46 corresponds to at least one of the abnormalities of the vehicle behavior, the vehicle behavior determining module 46 then determines that the vehicle behavior is abnormal, and notifies the abnormality of the vehicle behavior to the operator by the alarm, etc.

If the head-pitch angle change Δθp is greater than the given second head-pitch angle change θ1 and the abnormal state of the vehicle behavior continues for more than the given time T (in this embodiment, for example, T=1 second), the abnormality determining module 44 then concludes that the operator is in the abnormal state. Note that the timer module 45 counts a continuation time from a time point at which the head-pitch angle change Δθp is determined to be greater than the given second head-pitch angle change θ1 and the vehicle behavior is determined to be in the abnormal state.

After the timer module 45 counts the given time, the abnormality determining module 44 gives an alert to the operator by the alarm, etc., and if there is no reaction of the operator, the driving assist is carried out.

Further, if the initial torso angle θt is greater than the given turnout angle θ0, the abnormality determining module 44 then determines whether the head-pitch angle change Δθp is greater than the given head-pitch angle change θ3 (e.g., 45°). If the head-pitch angle change Δθp is less than the given head-pitch angle change θ3, the abnormality determining module 44 determines that the vehicle behavior is not abnormal.

On the other hand, if the head-pitch angle change Δθp is greater than the given head-pitch angle change θ3, the abnormality determining module 44 then concludes that the operator is in the abnormal state when a state where the head-pitch angle change Δθp is greater than the given head-pitch angle change θ3 continues for more than the given time T (in this embodiment, for example, T=1 second). Note that the timer module 45 counts a continuation time from a time point at which the head-pitch angle change Δθp is determined to be greater than the given head-pitch angle change θ3.

After the timer module 45 counts the given time T, the abnormality determining module 44 gives an alert to the operator by the alarm, etc., and if there is no reaction of the operator, the driving assist is carried out.

Here, a method of calculating the given turnout angle θ0, the given second head-pitch angle change θ1, the given torso angle change θ2, and the given head-pitch angle change θ3 by a simulation is described.

Figure 4:
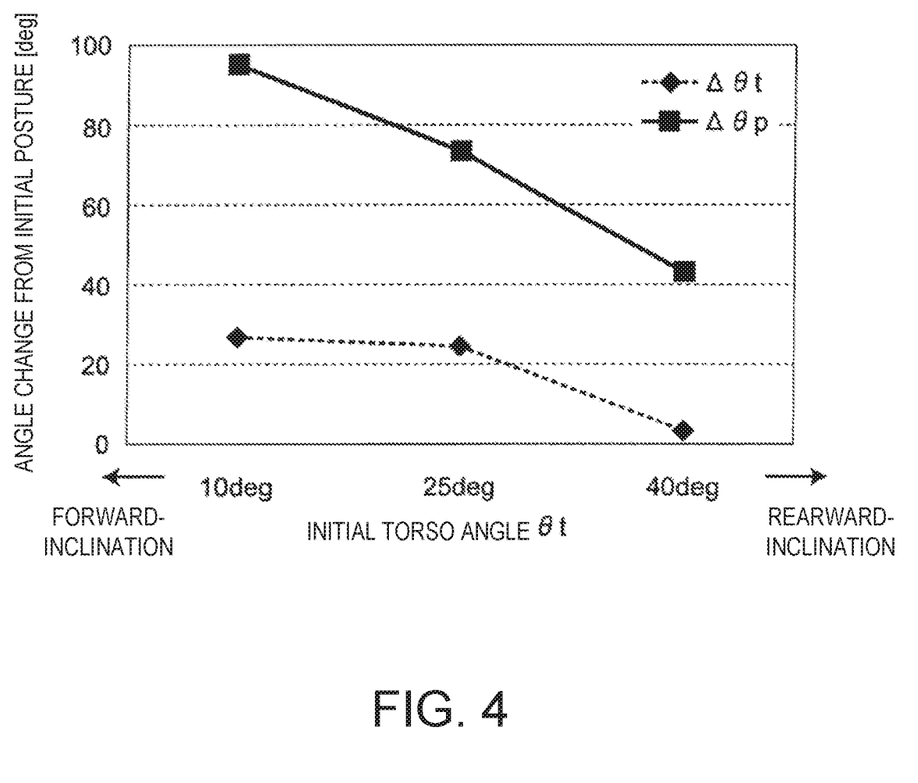
FIG. 4 is a graph illustrating an initial torso angle versus a torso angle change and a head-pitch angle change after an operator becomes unconscious.

First, the given turnout angle θ0 is described with reference to FIG. 4. FIG. 4 illustrates the initial torso angle θt versus the torso angle change Δθt which is an amount of change in the torso angle from the initial posture, immediately after the operator becomes unconscious, and the head-pitch angle change Δθp which is an amount of change in the head-pitch angle from the initial posture, immediately after the operator becomes unconscious. Note that in this simulation, as each of the angle changes Δθt and Δθp, angle changes after 500 ms of the beginning of the posture change from the initial posture are used.

According to the simulation results, it was found that the torso angle change Δθt tends to be reduced as the initial torso angle θt increases on the rearward-inclination side. In particular, the torso angle change Δθt changes largely from 20° to 5°, while the initial torso angle θt is between 25° and 40°.

From the simulation results, as the first findings, the initial torso angle (initial rearward-inclination angle) which can be used as a turnout angle of the inclining direction of the operator falling forward or rearward, is calculated to be the given turnout angle θ0 (e.g., the given angle between 35° and 40°).

Further, the applicant thought that characteristics of the operator's posture after becoming unconscious may differ when falling forward and when falling rearward with respect to the calculated given turnout angle θ0, thereby the applicant performed a simulation under this hypothesis.

Figure 5A:
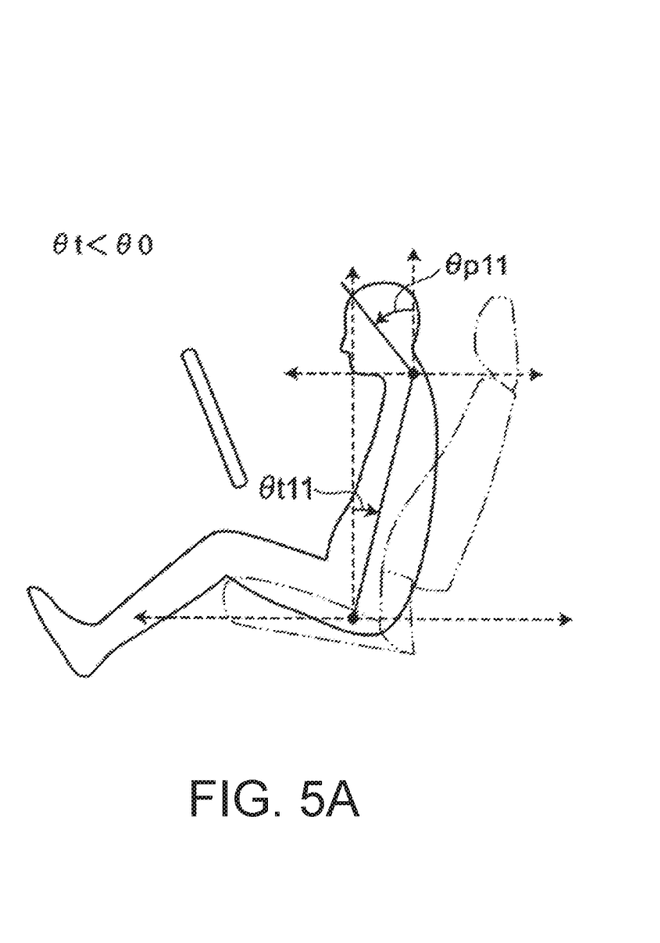
Figure 5B:
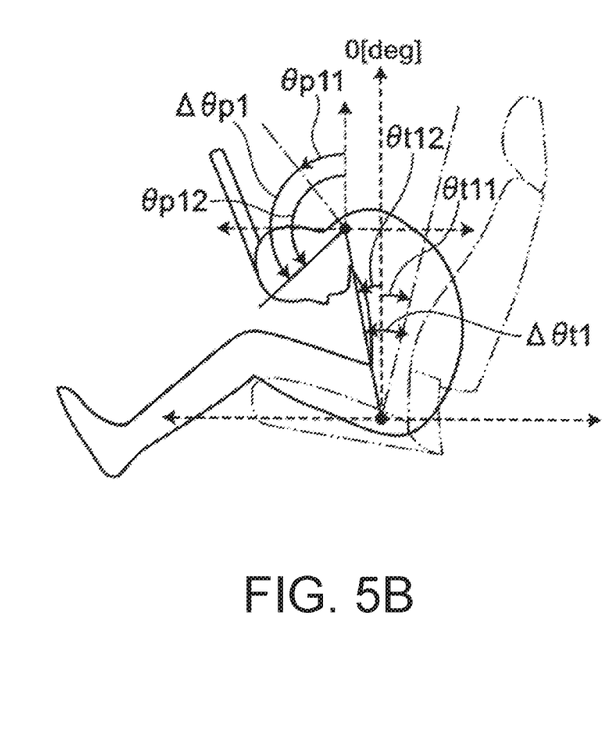
Figure 5C:
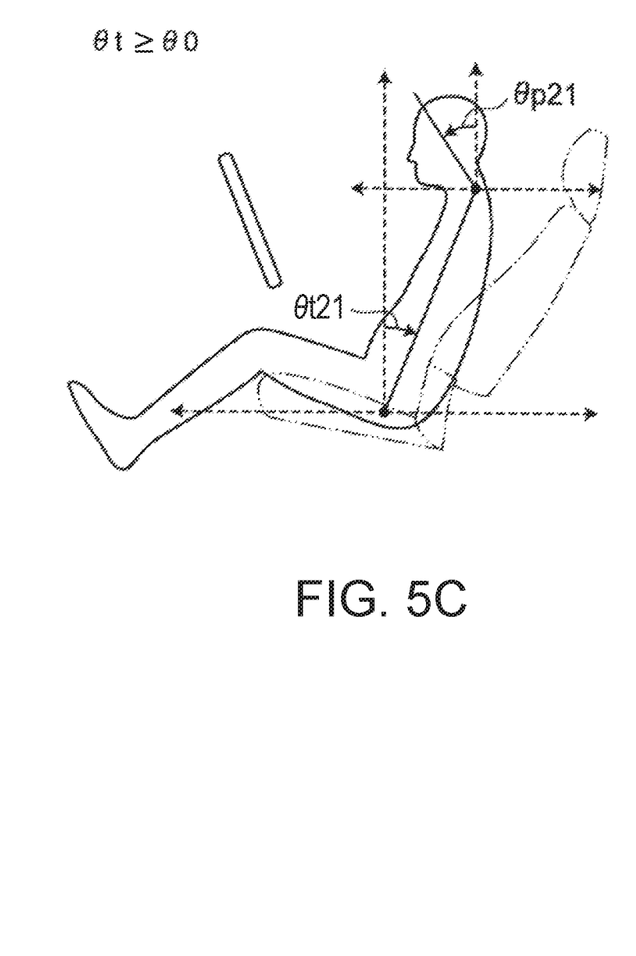
Figure 5D:
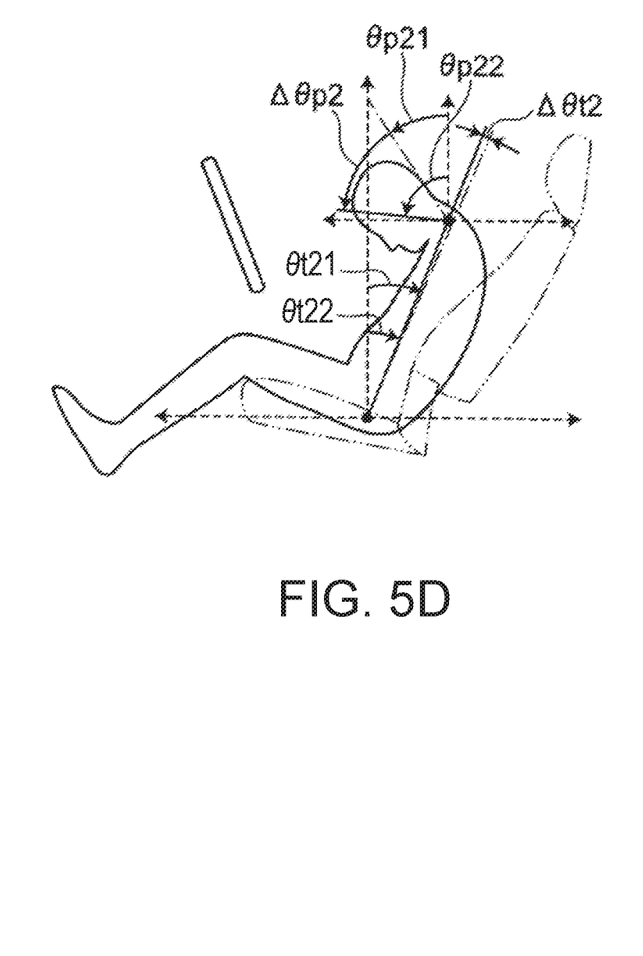

FIGS. 5A to 5D illustrate results of the simulation, in which the operating postures in the normal state of the operator and the post-unconscious state are compared, where FIGS. 5A and 5B illustrate a case where the initial torso angle θt is less than the given turnout angle θ0, and FIGS. 5C and 5D illustrate a case where the initial torso angle θt is greater than the given turnout angle θ0.

According to this simulation, when the operator falls forward after becoming unconscious (when the initial torso angle θt is less than the given turnout angle θ0), the torso angle and the head-pitch angle are both inclined greatly forward from the initial posture, and a torso angle change Δθt1 and a head-pitch angle change Δθp1 are both greater than the given angles.

On the other hand, the applicant acquired as second findings that, when the operator falls rearward after becoming unconscious (when the initial torso angle θt is greater than the given turnout angle θ0), an obvious torso angle change Δθt2 cannot be obtained, and the degree of forward-inclination or the head-pitch angle change Δθp decreases as compared with the case where the initial torso angle θt is less than the given turnout angle θ0.

For example, when the initial torso angle θt is less than the given turnout angle θ0, as illustrated in FIGS. 5A and 5B, a torso angle θt11 before unconsciousness (a) becomes on the rearward-inclination side with respect to the vertical direction, while a torso angle θt12 after unconsciousness (b) changes to forward from with respect to the vertical direction. The torso angle changes by the torso angle change Δθt1=θt11+θt12.

Moreover, a head-pitch angle θp11 before unconsciousness (a) is on the forward-inclination side with respect to the vertical direction, and a head-pitch angle θp12 after unconsciousness (b) changes further to the forward-inclination side than the head-pitch angle θp11 before unconscious. The head-pitch angle changes by the head-pitch angle change Δθp1=θp12−θp11.

On the other hand, when the initial torso angle θt is greater than the given turnout angle θ0, as illustrated in FIGS. 5C and 5D, a torso angle θt21 before unconsciousness (a) is on the rearward-inclination side with respect to the vertical direction, and a torso angle θt22 after unconsciousness (b) also changes to the rearward-inclination side from the vertical direction. As a result, since the torso angle changes by the torso angle change Δθt2=θt22−θt21, as illustrated by Δθt2 in FIG. 5D, an obvious torso angle change Δθt2 cannot be obtained.

Moreover, a head-pitch angle θp21 before unconsciousness (a) is on the forward-inclination side with respect to the vertical direction, and a head-pitch angle θp22 after unconsciousness (b) changes further to the forward-inclination side than the head-pitch angle θp21 before unconscious. Therefore, although the head-pitch angle changes by a head-pitch angle change Δθp2=θp22−θp21, the head-pitch angle change Δθp is less than the case where the initial torso angle θt is less than the given turnout angle θ0, in connection with the torso angle change Δθt2 being small.

Figure 6A:
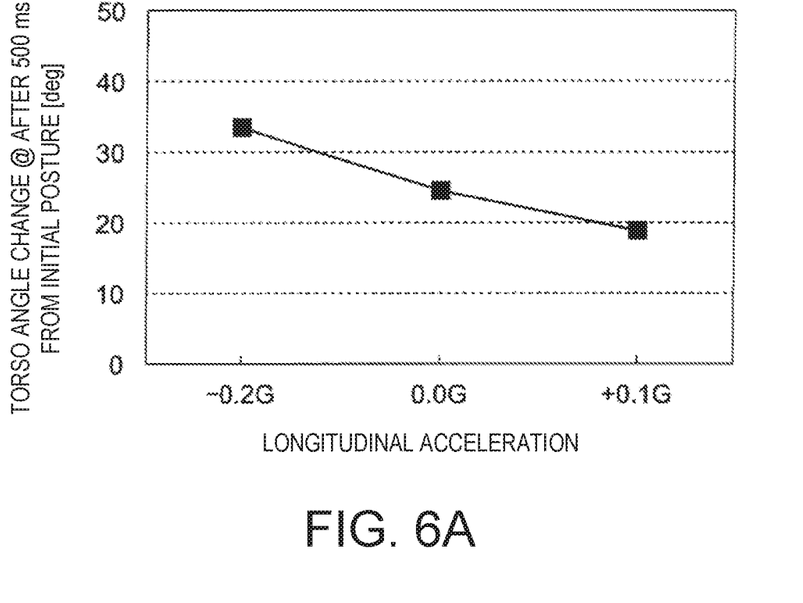
FIG. 6A is a graph illustrating the torso angle change versus a longitudinal acceleration.
Figure 6B:
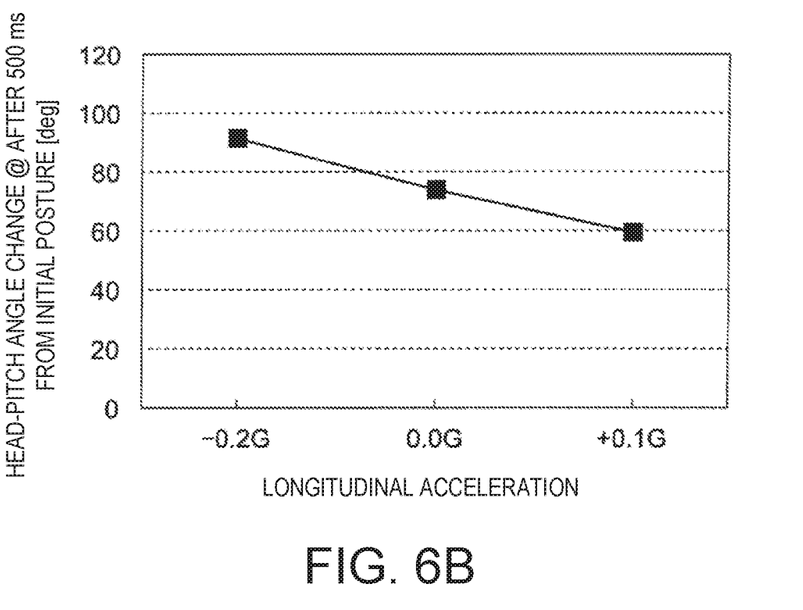
FIG. 6B is a graph illustrating the head-pitch angle change versus the longitudinal acceleration.

Next, with reference to FIG. 6, a method of setting the given second head-pitch angle change θ1, the given torso angle change θ2, and the given head-pitch angle change θ3 is described.

Since it is well-known that the operator is pushed rearward (to the seat-back side) when the forward acceleration occurs, the applicant thought that the change on the forward-inclination side can be reduced also in the posture change before and after the operator becomes unconscious, and decided to use thresholds which are obtained by adding the influence of the longitudinal acceleration to the given angle changes θ1, θ2, and θ3. Therefore, since the posture change of the operator before and after becoming unconscious when the longitudinal acceleration is given is calculated by the simulation, this will be described below. Note that in this embodiment, values acquired from the following simulation results are used as the given angle changes θ1, θ2, and θ3 stored beforehand in the memory 42.

As a model for the simulation, assuming that the operator sits at a standard torso angle (e.g., 25°) and the longitudinal acceleration is given, the torso angle change and the head-pitch angle change are calculated as parameters of the posture change before and after the operator becoming unconscious.

According to this simulation, it was found that, as illustrated in FIG. 6A, the torso angle change Δθt at the longitudinal acceleration 0 G is 25°, while the torso angle change Δθt at the longitudinal acceleration +0.1 G is less than 20°. As illustrated in FIG. 6B, it was also found that the head-pitch angle change Δθp at the longitudinal acceleration 0 G is 75°, while the head-pitch angle change Δθp at the longitudinal acceleration +0.1 G is 60°.

From the above results, it was found that, when the torso angle change (25°) and the head-pitch angle change (75°) at the longitudinal acceleration 0 G are used as the given angle changes θ1 and θ2 which are the thresholds for determining the abnormal state, there is a possibility of misjudging the abnormal state at the longitudinal acceleration +0.1 G as normal.

Therefore, in this embodiment, in order to consider the torso angle change and the head-pitch angle change of the abnormal state at the longitudinal acceleration 0.1 G, which are less than the thresholds at the longitudinal acceleration 0.0 G, the given second head-pitch angle change θ1 is set to 55° and the given torso angle change θ2 to 15°.

Further, as described above, when the initial torso angle θt is greater than the given turnout angle θ0 (when the operator falls rearward after becoming unconscious), the change in the torso angle before and after unconscious cannot be seen and the change in the pitch angle is also reduced accordingly. Therefore, in this embodiment, the given head-pitch angle change θ3 is set as a given angle (e.g., 45°) less than the given second head-pitch angle change θ1 (55°) described above.

Figure 7:
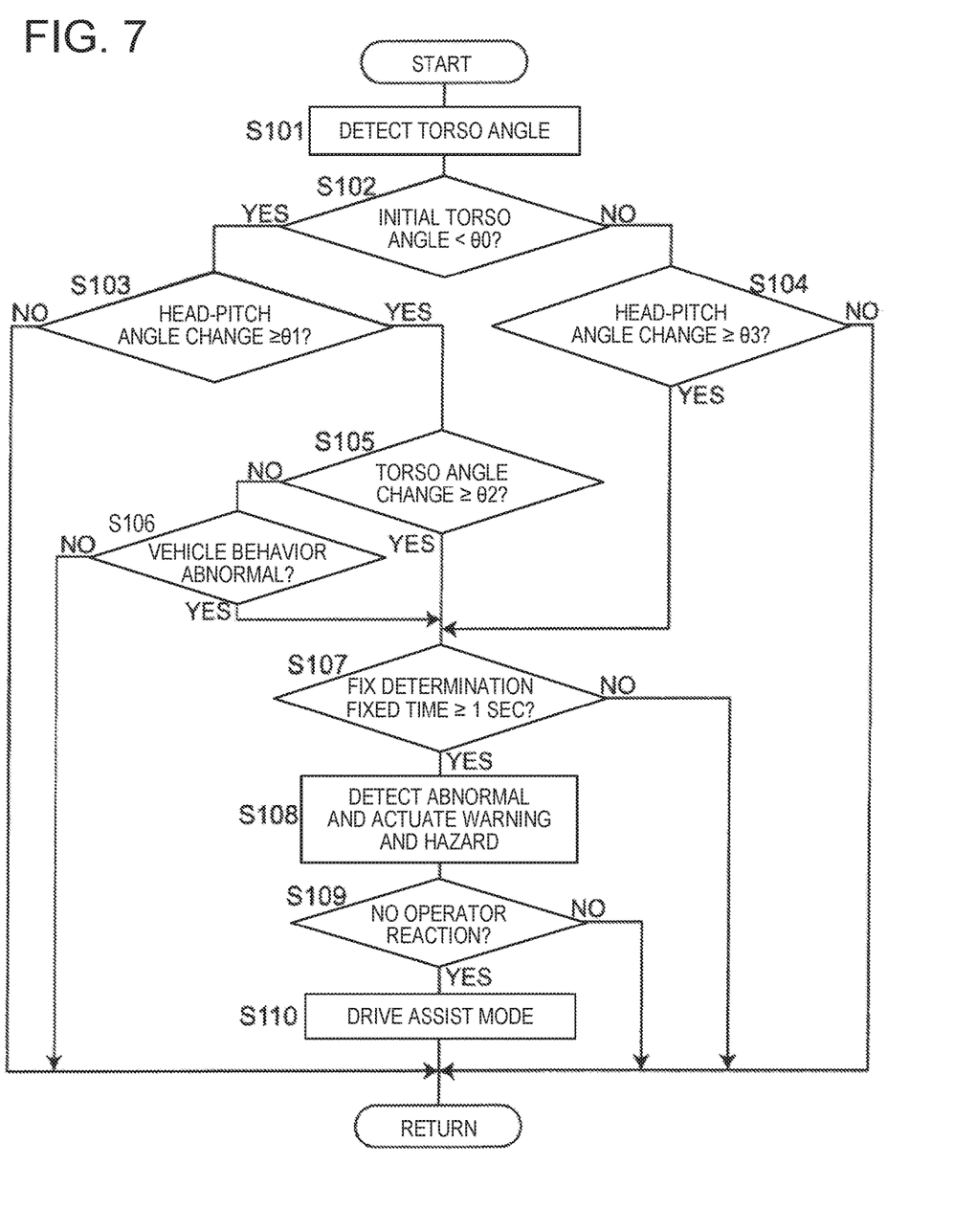
FIG. 7 is a flowchart illustrating one example of an operator state determining operation.

Next, an operator state determining operation by the control unit 40 is described using the flowchart of FIG. 7.

First, at Step S101 in the flowchart of FIG. 7, an operator's torso angle θt is detected from the image of the operator from the internal camera 21, and the torso angle θt is determined.

At Step S102, the posture measuring module 43 determines whether the initial torso angle θt is greater than the given turnout angle θ0 (e.g., a given angle between 35° and 40°).

If the initial torso angle θt is less than the given turnout angle θ0, the abnormality determining module 44 shifts the processing to Step S103. On the other hand, if the initial torso angle θt is greater than the given turnout angle θ0, the abnormality determining module 44 shifts the processing to Step S104.

At Step S103, it is determined whether the head-pitch angle change Δθp is greater than the given second head-pitch angle change θ1 (e.g., 55°). If the head-pitch angle change Δθp is less than the given second head-pitch angle change θ1, the abnormality determining module 44 determines that the operator is not in the abnormal state, and ends the processing.

On the other hand, if the head-pitch angle change Δθp is greater than the given second head-pitch angle change θ1, it shifts to Step S105, where it is determined whether the torso angle change Δθt is greater than the given torso angle change θ2. If the torso angle change Δθt is less than the given torso angle change θ2, it shifts to Step S106.

At Step S106, the vehicle behavior determining module 46 determines whether the vehicle behavior is abnormal based on the vehicle behavior determining method described above (the excessive acceleration or deceleration, the lane deviation degree, and the collision margin time). If the vehicle behavior is not in the abnormal state, the abnormality determining module 44 determines that the operator is not in the abnormal state, and ends the processing. On the other hand, if the vehicle behavior is in the abnormal state, the abnormality determining module 44 determines that the operator is in the abnormal state, and shifts to Step S107.

Moreover, at Step S105, if the torso angle change Δθt is greater than the given torso angle change θ2, the abnormality determining module 44 determines that the operator is in the abnormal state, and shifts to Step S107.

At Step S102, if the initial torso angle θt is greater than the given turnout angle θ0, it shifts to Step S104. At Step S104, the abnormality determining module 44 determines whether the head-pitch angle change Δθp is greater than the given head-pitch angle change θ3. If the head-pitch angle change Δθp is greater than the given head-pitch angle change θ3, the abnormality determining module 44 shifts the processing to Step S107. On the other hand, if the head-pitch angle change Δθp is less than the given head-pitch angle change θ3, the abnormality determining module 44 determines that the operator is not in the abnormal state, and ends the processing.

At Step S107, the timer module 45 counts a lapsed time. The lapsed time is a lapsed time from a time point at which the abnormality determining module 44 determines that the operator is in the abnormal state. For example, it is a lapsed time from a time point at which the torso angle change Δθt is determined to be greater than the given torso angle change θ2 at Step S105, a time point at which the vehicle behavior is determined to be in the abnormal state at Step S106, and a time point at which the head-pitch angle change Δθp is determined to be greater than the given head-pitch angle change θ3 at Step S104.

At Step S107, the timer module 45 determines whether the counting lapsed time has reached the given time T (e.g., 1 second). If the lapsed time has reached the given time, the timer module 45 shifts the processing to Step S108. On the other hand, if there is an operator's reaction before the lapsed time reaches the given time, the timer module 45 ends the processing.

At Step S108, the abnormality determining module 44 determines that the operator is in the abnormal state, and then actuates the warning sound generator 31 to alert the operator.

At Step S108, the drive controlling module 47 actuates the hazard flasher 32 to blink the hazard lamps. At subsequent Step S109, the existence of the operator's reaction is determined. If there is an operator's reaction, for example, if there is an operation of the operation switch 23 for turning off the warning sound, the abnormality determination is canceled and the processing is ended.

On the other hand, at Step S109, if there is no reaction of the operator, the abnormality determining module 44 shifts the processing to Step S110. At Step S110, the drive controlling module 47 actuates the drive assist device 33. Then the operation ends.

Note that in this embodiment, although the internal camera 21 is used as the rearward-inclination angle detector, the rearward-inclination angle detector may detect, for example, a rearward-inclination angle of the seat back by using a seat-back sensor, etc.

Moreover, in this embodiment, although the torso angle is used as the rearward-inclination angle of the operator's torso, the seat-back angle may be used instead of the torso angle. For example, the seat-back sensor may detect the seat-back angle. Note that since a hip point normally tends to be located forward of the seat back, a larger value may be used for the torso angle than the seat-back angle, as the rearward-inclination angle.

As described above, according to the present disclosure, since the present disclosure determines certainly that the operator fell in the abnormal state based on the operating posture of the operator, the present disclosure can be suitably utilized in the field of safety technologies of vehicles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Operator State Determining Device
13 Operator
21 Internal Camera (Image Pick-up Device)
42 Memory
43 Posture Measuring Module
44 Abnormality Determining Module
θ0 Given Turnout Angle
θ1 Given Second Head-Pitch Angle Change
θ2 Given Torso Angle Change (Given Rearward-inclination Angle Change)
θ3 Given Head-pitch Angle Change
θt Initial Torso Angle (Initial Rearward-inclination Angle)
Δθp Head-pitch Angle Change
Δθt Torso Angle Change (Rearward-inclination Angle Change)

What is claimed is:

1. An operator state determining device, comprising:
an image pick-up device disposed inside a cabin of a vehicle, and configured to capture image data of an operator from a side, the image pick-up device also being configured as a torso angle detector configured to detect a first torso angle and a second torso angle of the operator;
a processor configured to execute a posture measuring module to measure a torso angle change that is an amount of change between the first torso angle before the operator assumes a posture corresponding to an unconscious state and the second torso angle after the operator assumes the posture corresponding to the unconscious state, based on the first torso angle, the second torso angle, and the torso angle change of the operator detected by the torso angle detector;
a memory configured to store a given turnout angle, a given second head-pitch angle change, and a given torso angle change,
the posture measuring module is configured to be further executed by the processor to measure a head-pitch angle change that is a difference between a first head-pitch angle of the operator before the operator assumes the posture corresponding to the unconscious state and a second head-pitch angle of the operator after the operator assumes the posture corresponding to the unconscious state, based on the image data of the operator imaged by the image pick-up device, and
wherein the processor is further configured to execute an abnormality determining module to determine that the operator is in an abnormal state when the first torso angle detected by the torso angle detector before the operator assumes the posture corresponding to the unconscious state is inclined rearward more than the given turnout angle, and the head-pitch angle change is greater than the given second head-pitch angle change, and the torso angle change is greater than the given torso angle change.

2. An operator state determining device, comprising:
an image pick-up device disposed inside a cabin of a vehicle, and configured to capture image data of an operator from a side, the image pick-up device also being configured as a torso angle detector configured to detect a first torso angle and a second torso angle of the operator;
a processor configured to execute a posture measuring module to measure a torso angle change that is an amount of change between the first torso angle before the operator assumes a posture corresponding to an unconscious state and the second torso angle after the operator assumes the posture corresponding to the unconscious state, based on the first torso angle, the second torso angle, and the torso angle change of the operator detected by the torso angle detector;
a memory configured to store a given turnout angle, a given second head-pitch angle change, and a given torso angle change,
the posture measuring module is configured to be further executed by the processor to measure a head-pitch angle change that is a difference between a first head-pitch angle of the operator before the operator assumes the posture corresponding to the unconscious state and a second head-pitch angle of the operator after the operator assumes the posture corresponding to the unconscious state, based on the image data of the operator imaged by the image pick-up device, and
wherein the processor is further configured to execute an abnormality determining module to determine that the operator is in an abnormal state when the first torso angle detected by the torso angle detector before the operator assumes the posture corresponding to the unconscious state is forward and less than the given turnout angle, the head-pitch angle change is greater than the given second head-pitch angle change, and the torso angle change is greater than the given torso angle change.

3. The operator state determining device of claim 2, wherein the memory is further configured to store a given first head-pitch angle change; and
wherein the given first head-pitch angle change is less than the given second head-pitch angle change.

4. The operator state determining device of claim 1, wherein the given turnout angle is a given angle between 35° and 40°.

5. The operator state determining device of claim 1, wherein the first torso angle is an inclination angle of a seat back with respect to a vertical direction, and the given turnout angle is a given angle between 30° and 35°.

6. The operator state determining device of claim 1, wherein the abnormality determining module determines that there is no abnormality when an acceleration of the vehicle is greater than a given acceleration.

7. The operator state determining device of claim 2, wherein the given turnout angle is a given angle between 35° and 40°.

8. The operator state determining device of claim 2, wherein the first torso angle and the second torso angle are inclination angles of a seat back with respect to a vertical direction, and the given turnout angle is a given angle between 30° and 35°.

9. The operator state determining device of claim 2, wherein the abnormality determining module determines that there is no abnormality when an acceleration of the vehicle is greater than a given acceleration.

\* \* \* \* \*